United States Patent

[11] 3,614,561

[72] Inventors Reinhard Behn
Munich;
Gerhard Hoyler, Munich; Hartmut Kessler, Regensburg, all of Germany
[21] Appl. No. 834,247
[22] Filed June 18, 1969
[45] Patented Oct. 19, 1971
[73] Assignees Siemens Aktiengesellschaft
Berlin & Munich, Germany;

[32] Priority June 25, 1969
[33] Germany
[31] P 17 64 548.6

[54] ELECTRICAL CONDENSER
3 Claims, 1 Drawing Fig.
[52] U.S. Cl. ................................................ 317/258,
29/25.42, 317/261
[51] Int. Cl. ................................................ H01g 1/13
[50] Field of Search ............................................ 317/258,
261, 260; 29/25.42

[56] References Cited
UNITED STATES PATENTS
2,731,706 6/1956 Grouse ........................ 317/258 UX
3,391,313 7/1968 Hevey ......................... 317/258
OTHER REFERENCES
Sisler et al., College Chemistry A Systematic Approach, MacMillan Co., N.Y., 1956, p. 569

Primary Examiner—E. A. Goldberg
Attorney—Hill, Sherman, Meroni, Gross & Simpson

ABSTRACT: An electrical stack or layer condenser produced by coiling plastic tapes carrying a metal coating on a drum and by dividing the master coil placed on the drum into the desired individual condensers employ stretchable plastic material, polycarbonates, polyethylene, terephthalate, polypropylene as the dielectricum and metallic coatings having a conductivity of less then 1.5 mho. The dividing causes the plastic to shrink away from edge of the capacitor causing a tearing of the metal coating. The torn portion of the metal coating has an oxide coating.

PATENTED OCT 19 1971 3,614,561
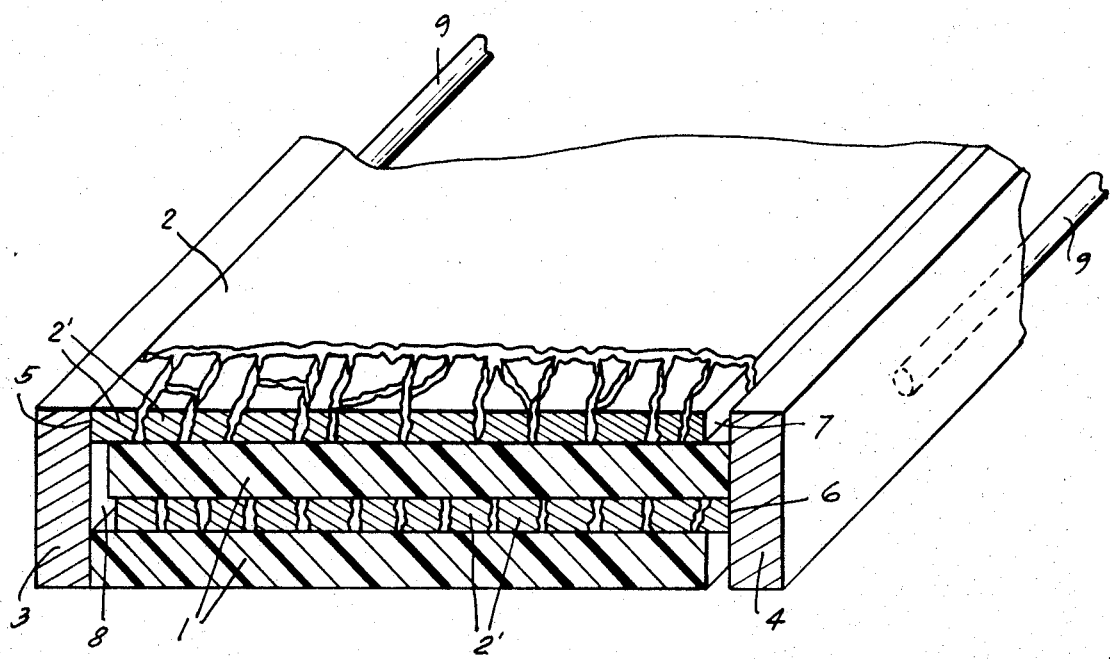
INVENTORS
REINHARD BEHN
GERHARD HOYLER
HARTMUT KESSLER
ATTORNEYS

ELECTRICAL CONDENSER

BACKGROUND OF THE INVENTION

1. Field of the Invention

This invention relates to electrical stack or layer condensers with regenerably thin metal coatings which are produced by winding condenser tapes on a drum and by dividing the master coil so wound on the drum into the desired partial capacities, and more particularly to the condenser construction.

2. Description of the Prior Art

Methods for producing stack or layer condensers are generally known in the art. For example, attention is directed to the published Dutch Pat. application No. 165,829 for a detailed account of such a method. Generally, however, the production of condensers by such methods include winding several layers of condenser tapes on a large diameter drum to form a master spiral or master condenser is then divided into the desired partial or individual condensers.

The stack or layer condensers possess, as a rule, regenerably thin metallic coats which are contacted at the frontal sides by sprayed-on metallic frontal contact layers. In cube-shaped condensers the metallized dielectricum layers are stacked, and that the bisecting or threading surfaces which define the periphery of such condensers opposite polarity metallic coatings border each other at a distance of the thickness of the dielectricum, that is, at thicknesses of from 2 to 10 $\mu$m. when voltage is applied to such a condenser spark-overs are expected to occur at these edges. Although such spark-overs do not cause a short circuit to the condenser, as the metal coatings burn off at these points in a manner known from self-healing condensers, these spark-overs will damage, through the current impulses occuring thereby, the contacting of the condenser and reduce the capacity of the condenser by the width of the burned out strip in relation of this strip to the entire width, which may amount to from 1 to several millimeters depending on the voltage applied. Moreover, the mechanical vibrations associated with the burn-out process reduce the strength of such a condenser.

SUMMARY OF THE INVENTION

According to the present invention, the foregoing problems can be avoided by having the dielectricum consist of stretchable plastic foils and with coatings having a conductivity of less than 1.5 mho.

We have discovered that by appropriate selection of the dielectricum and of the metallic coating employed, no flashovers occur at the cutting surfaces, without additional treatment, at voltages of up to about 500 volts. This is accomplished by employing a stretched plastic foil as the dielectricum, which is so changed by local heating caused by the separation process from the master condenser that a slight shrinkage occurs adjacent the formed edges so that the thin metal layer carried by the dielectricum is torn in the area adjacent the formed edges to form small islets of material. The coating metal has the property of at once coating the exposed surfaces with highly insulating oxide and the islets are insulated from each other and thus form a nonconductive strip about 0.1 mm. wide adjacent the cut edge.

BRIEF DESCRIPTION OF THE DRAWING

Other objects, features and advantages of the invention will be readily apparent from the following description of the preferred embodiments thereof, taken in conjunction with the accompanying drawing, although variations and modifications may be effected without departing from the spirit and scope of the novel concepts of the disclosure, and in which the single FIGURE illustrates a stack or layer condenser that has been cut from a master condenser.

DESCRIPTION OF THE PREFERRED EMBODIMENTS

In the drawing, a partial or individual capacitor that has been cut from a master condenser is illustrated as comprising a stack of stretchable plastic foils 1, each of which carries its own individual condenser plate electrode 2 which protrudes slightly from its carrier at 5, 6 leaving corresponding gaps at 7, 8 and which is to be later contacted as terminals of the condenser. The plastic foils or carriers for the electrodes consists of stretchable plastic which will shrink upon the application of heat and are preferably of polycarbonate, polyethylene terephthalate or polypropylene.

The slightly protruding coating edges of the regenerably thin metallic coat electrodes are seized and bonded as condenser terminals by the sprayed-on frontal contact metallic layers 3 and 4. The external current feed or conductors 9 may be soldered to the frontal contact layers 2 and 3.

The prevention of flash-overs at the cutting edges which define the individual cut condensers is accomplished by employing a stretchable plastic as the carrier for the metallic plate layers, which are of plastic material is affected by local heating during the separation process so that it will shrink in the area adjacent the cut. The separation process usually employs a sawing of the master condenser perpendicular to the planes of its layers, which sawing will generate heat in the individual condensers being formed immediately adjacent the saw kerf. The action of the saw blade is further effective to break up the thin metal plate layers into chips or clods 2' which, upon the shrinking of the plastic carrier layers obtain a highly insulating oxide in their exposed surfaces. These clips, clods or islets 2' are insulated from each other and thus form a nonconductive strip adjacent the cut edge.

Ordinary metallic circular saw blades from 0.3 to 0.5 mm. thickness having fine serrations proved to be appropriate as separation tools. Stretched shrinkable foils made from the following materials exhibited the desired effect, so that they are particularly appropriate: polycarbonate, polyethylene, terephthalate and polypropylene. The coating metal for the thin metal plate layers which met the requirements demand was aluminum having a coating capacity of less than 1.5 mho.

The production of condensers can be rendered economical by spraying the master coil on the drum prior to splitting, for example, by sawing at the front sides. Master coils of about 50 cm. diameter on a drum are coiled and then contacted by the metal spray method. Generally then there has been described in the techniques for providing electrical stack or layer condensers from a master condenser which has as its dielectricum carriers stretchable, heat-shrinkable material carrying a metal coating which breaks up adjacent the edges formed by cutting the individual condensers from the master condenser. The breaking up of the metallic coatings in this area is effected due to the heat of separation causing the dielectricum material to shrink. The broken metallic layers in this area form small islets which immediately oxidize on their surfaces exposed by shrinkage of the dielectricum to provide a highly insulated edge for the condenser.

We claim:

1. A layer electrical condenser comprising a plurality of heat shrinkable plastic dielectric layers and a plurality of metallic layers each having a conductivity less than 1.5 mho, each of said metallic layers carried by separate ones of said dielectric layers and including edges carried by corresponding portions of said dielectric layers, said portions of said dielectric layers deformed by shrinkage and the edges carried thereon comprising small broken up oxidized portions.

2. An electrical condenser according to claim 1 wherein the plastic dielectric layers are selected from a group consisting of polycarbonate, polyethylene terephthalate and polypropylene.

3. An electrical condenser according to claim 1 wherein the metallic coatings consist of aluminum.